June 20, 1939. E. R. RICHARDS 2,162,825
METHOD OF AND APPARATUS FOR MAKING ELECTROTYPE PLATES
Filed July 11, 1935
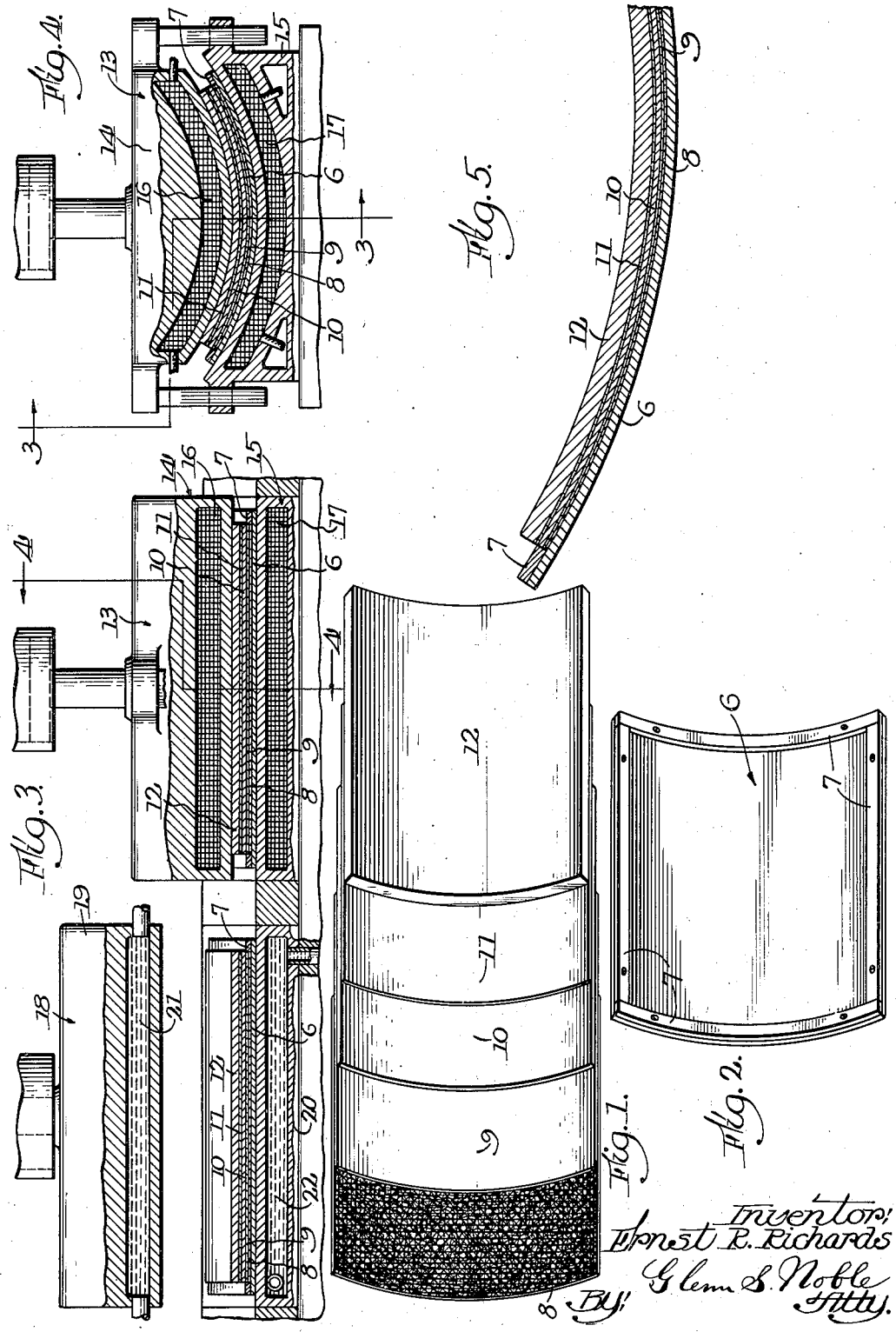

Patented June 20, 1939

2,162,825

UNITED STATES PATENT OFFICE 2,162,825

METHOD OF AND APPARATUS FOR MAKING ELECTROTYPE PLATES

Ernst R. Richards, Chicago, Ill.

Application July 11, 1935, Serial No. 30,938

6 Claims. (Cl. 101—401.1)

This invention relates to the manufacture of electrotype plates and particularly to the making of curved plates for use on rotary magazine and multi-color presses. The difficulties and expense of making such electrotype plates by the methods and apparatus commonly used are so well known that it is only necessary to suggest some of them. After the shell is made from a mold in the usual manner, it is laid face down in a cast-iron pan with the back covered with tin-foil and the pan is put on top of a furnace, where it stays until the tin-foil is melted, and then the backing metal is poured over the back of the shell, filling the pan. The plate then follows the usual course of finishing to prepare it for the press. During these operations, the copper shell lying loose in the pan is badly distorted when subjected to heat to melt the tinfoil; the hand finishing, pounding on the back with face of plate against a steel slab, damages the printing surface, and the register of the plate is affected by stretching during the curving operation.

The present invention is intended to overcome these and other objectionable features of the present processes as will appear more fully hereinafter.

The objects of this invention are to provide an improved method of and apparatus for making curved electrotype plates without affecting the printing surface of the shell, to provide a method of making electrotype plates in which the electrotype shell or printing surface is curved and then secured to a curved metal backing as by being soldered or fused thereto; to provide a method of making curved electrotype plates in which the printing shell is first made in the usual manner and then curved to conform to the printing cylinder, and then applied to a backing of suitable metal curved to conform to the shell, with suitable soldering and filling material therebetween, then applying heat and pressure to solder the parts together and finally cooling the united parts while they are subjected to pressure to hold the same in proper shape.

Other objects will also appear from the following description taken in connection with the accompanying drawing, in which Figure 1 is a perspective view showing the shell and backing with the uniting and filling material arranged in projected position preparatory to assembling;

Figure 2 is a perspective view of the tray or form for supporting the parts during the soldering or uniting operations;

Figure 3 is a longitudinal sectional view taken on line 3—3 of Figure 4, showing the apparatus used for the soldering or uniting operations, parts being shown conventionally or diagrammatically for convenience in illustration;

Figure 4 is a sectional view taken on the line 4—4 of Figure 3; and

Figure 5 is a sectional detail of the tray and assembled parts.

In accordance with this invention I provide a tray or form 6 such as shown in Figure 2, which conforms to the shape of the curved electrotype plate which is to be made, this form being preferably made of brass or other suitable material about one-sixteenth of an inch in thickness with a rim or bead 7 around the edges and of proper size so that the electrotype plate will fit closely therein. The electrotype or printing shell 8 is made flat in the usual manner as by electro-deposition and consists of a thin sheet of copper metal with the reading matter or the like thereon. This shell is then curved to the desired curvature of the cylinder as shown in Figure 1. It is laid face down in the tray or form 6 and fits closely within the rim or border 7. The back or upper surface of the shell is then covered with tin-foil 9 or other suitable soldering or uniting material. This tin-foil may be either in the form of a sheet which is co-extensive with the shell or may consist of a plurality of strips. A curved sheet 10 of soft molding lead or other suitable filler material is then placed on the tin-foil and this in turn is covered with another layer of tin-foil 11 or other suitable soldering material. A curved plate 12 of electrotype backing metal such as lead or lead composition is then placed on the tin-foil 11 with these parts registering with each other as indicated in Figure 5.

It is well known that the back of the shell 8 is not smooth but consists of innumerable points and depressions, and I have found it desirable to provide a layer of soft molding lead or suitable material having a lower fusing point than the shell and the backing, in order to fill all of the indentations in the back of the shell and to make a firm and continuous joint between the shell and the backing 12. While these different elements may be made of any suitable size and thickness, I have found that a sheet of molding lead about .06 of an inch thick and a backing about .20 of an inch thick may be successfully used with tin-foil of the kind furnished for commercial purposes.

The tray or form 6 with the parts assembled thereon as shown in Figure 5 is then placed in a forming press 13, such as shown in Figures 3 and 4, and which is provided with male and female dies 14 and 15 having their opposed or operating faces curved to conform to the curvature desired for the finished plate. These forming dies may be heated in any suitable manner as by means of electric heating elements 16 and 17 respectively, which may be supplied with current from any suitable source of electric supply. The press is heated to approximately 350 degrees F. and the tray 6 and the parts thereon are inserted in position and heated at such temperature for about ten minutes. It is then subjected to sufficient pressure to properly co-act with the heat to cause the electrotype shell and backing to be firmly united. During this operation the soft metal layer 10 flows or is pressed into intimate engagement with the back of the shell and the layers of tin-foil act as solder to unite the molding lead with the shell and also with the backing. After the parts have been heated and pressed together in this manner, the tray 6 with the layers or plates thereon is then removed from the heating press and placed in a cooling box or press such as indicated at 18. This press has a male die or punch 19 and female die 20 which are provided with chambers 21 and 22 respectively, for circulation of water or other suitable cooling media. These dies are also shaped to conform to the finished electrotype and after the tray has been placed therein and sufficient pressure is applied to retain the shape of the united parts during the cooling operation. As soon as the electro-plate has become cooled the tray is removed and the plate is then ready for finishing to prepare it for use. Any suitable presses may be used for the purpose indicated, but ordinarily hydraulic presses of the kind shown will be found preferable.

After the plate is removed from the cooling press or box it is shaved in the curve on the back and the edges beveled and dead metal routed out preparatory to applying it to the press cylinder and when so finished it provides a true non-stretched electrotype plate or shell ready for use in printing.

While I have described a preferred method of performing my improved process, it will be noted that changes might be made in order to adapt the same for different conditions or requirements, and it will also be noted that as a result of such method I produce a new form of electrotype plate and therefore I do not wish to be limited to the exact method or article herein shown and described except as pointed out in the following claims in which I claim:

1. The improved method of making a curved electrotype plate which consists in curving an electrotype shell to the desired curvature for the cylinder, then applying soldering material to the concave surface of the shell, then super-imposing a relatively hard metallic backing on the shell, which is curved to conform to the shell, with a layer of filler material therebetween, confining the edges of the assembled parts to prevent lateral movement thereof, then placing the assembled parts in a press and heating the same while under pressure to a sufficient degree of temperature to soften the filler metal and cause it to flow into and fill all surface irregularities in said shell and melt the soldering material and cause it to unite the shell to the backing, and finally cooling the plate under pressure, tending to hold it in the shape desired for the press.

2. The method of making a curved electrotype plate which consists in providing a curved shell and a correspondingly relatively hard pre-curved metallic backing, placing the shell on the backing with a curved sheet of soft lead and layers of tin-foil between the same, confining the peripheral edges of the shell, soft lead and tin-foil layers to prevent lateral movement thereof, then subjecting the parts to heat and pressure to cause the plate to be united by said tin-foil with the curved sheet of soft lead and it in turn with the backing and to cause the soft lead to flow into and fill all surface irregularities in said shell, and finally cooling the parts under pressure.

3. The method of making an electrotype plate which consists in applying a backing of backing metal to an electrotype shell with an intermediate layer of metal of a lower fusing point than either the shell or the backing with soldering material between the intermediate layer and the shell and between the intermediate layer and the backing, confining the peripheral edges of the shell and layers, and then subjecting the same to heat and pressure to soften the intermediate layer and cause it to be compressed and flow into all surface irregularities in the shell to unite the shell to the backing.

4. The method of making a curved electrotype plate which consists in placing a curved electrotype shell in a support, then placing a suitable uniting material upon the shell, then placing a pre-curved backing upon the uniting material, confining the peripheral edge of the shell to prevent lateral movement thereof, and then subjecting the aforesaid parts to heat and pressure sufficient to soften the uniting material and cause it to unite the shell and backing and to fill all irregularities in the surface of the shell adjacent thereto.

5. In apparatus for making a curved electrotype plate for a printing machine and having an electrotype shell upon its outer surface, a tray curved to fit the outer surface of the plate, means to apply pressure to the plate in the tray, and a bead about the peripheral edge of said tray to fit the peripheral edges of the shell and confine them against movement laterally while the shell is in the tray and being pressed.

6. The method of making a curved electrotype plate which consists in arranging a curved electrotype shell in a support so as to prevent lateral movement thereof relatively to the support, then placing suitable uniting material upon the shell, then placing a pre-curved backing upon the uniting material, and then subjecting the aforesaid parts to heat and pressure sufficient to soften the uniting material and cause it to unite the shell backing and to fill all irregularity in the surface of the shell adjacent thereto.

ERNST R. RICHARDS.